(12) United States Patent
Akoglu et al.

(10) Patent No.: US 11,614,945 B2
(45) Date of Patent: Mar. 28, 2023

(54) APPARATUS AND METHOD OF A SCALABLE AND RECONFIGURABLE FAST FOURIER TRANSFORM

(71) Applicant: EpiSys Science, Inc., Poway, CA (US)

(72) Inventors: Ali Oliver Akoglu, Tucson, AZ (US); Joshua Mack, Tucson, AZ (US)

(73) Assignee: EPISYS SCIENCE, INC., Poway, CA (US)

( * ) Notice: Subject to any disclaimer, the term of this patent is extended or adjusted under 35 U.S.C. 154(b) by 689 days.

(21) Appl. No.: 16/697,399

(22) Filed: Nov. 27, 2019

(65) Prior Publication Data

US 2021/0157602 A1    May 27, 2021

(51) Int. Cl.
*G06F 9/38* (2018.01)
*G06F 12/02* (2006.01)
*G06F 17/14* (2006.01)
*G06F 9/448* (2018.01)

(52) U.S. Cl.
CPC .......... *G06F 9/3867* (2013.01); *G06F 9/3885* (2013.01); *G06F 9/4498* (2018.02); *G06F 12/0246* (2013.01); *G06F 17/142* (2013.01)

(58) Field of Classification Search
None
See application file for complete search history.

(56) References Cited

U.S. PATENT DOCUMENTS

| | | | |
|---|---|---|---|
| 2007/0088773 A1* | 4/2007 | Lai | G06F 17/142 708/400 |
| 2010/0174769 A1* | 7/2010 | Modlin | G06F 17/142 708/404 |
| 2020/0319296 A1* | 10/2020 | Gupta | G01S 7/352 |

* cited by examiner

*Primary Examiner* — Scott C Sun
(74) *Attorney, Agent, or Firm* — Ichthus International Law PLLC

(57) ABSTRACT

A novel design for conflict free address generation mechanism is provided for reading data from Block RAM (BRAM) into a Fast Fourier Transform (FFT) module and writing back the processed data back to the BRAM. Also, a novel way of reducing a memory footprint by reducing a twiddle factor table size by taking an advantage of the symmetry property of twiddle factors is presented. Further, additional architecture-specific optimizations are provided, which involve a design of deeply pipelined butterfly modules and the BRAM accesses, parallel butterfly modules for a single FFT block and parallel FFT lane implementation.

17 Claims, 9 Drawing Sheets

```
// MODIFIED ALGORITHM for FFT with D datapoints
// and S = log2(D) stages and group size G,
// and T = log2(G) toggle bits.

// All but final T-1 stages use index i as before
For each stage s=0 to S-T {
    for each index = i = 0 to D-1 {
        //rotate i left by s bits to get dp index d
        d[s, i] = left_rotate(i,s)
    }
}
// Remaining stages incrementally rotate the toggle bits,
// which form the left (hi or MSB) side of dp index d
For each stage s = (S-T)+1 to (S-1) {
    for each lo_bits = 0 to (D/G)-1 {   //lo bits of d
        for each togbits t=0 to (G-1) {  //hi bits of d
            // rotate t one bit left for every stage beyond
            hi_bits = left_rotate(t, s-(S-T))
            d[s,i] = concatenate(hi_bits, lo_bits)
        }
    }
}
```

FIG. 2A

APPARATUS AND METHOD OF A SCALABLE AND RECONFIGURABLE FAST FOURIER TRANSFORM

TECHNICAL FIELD

The present disclosure relates to design and implementation of scalable and reconfigurable Fast Fourier Transform (FFT), in particular, techniques including conflict free generation of memory access and other optimization methods.

BACKGROUND

In digital signal processing, Discrete Fourier Transform (DFT) plays a significant role in many applications such as filtering, time domain analysis, frequency domain analysis, spectral analysis, etc. To implement the DFT, a Fast Fourier Transform (FFT) algorithm or its variants are widely employed to speed up the computation process because FFT is a computationally intensive process. By way of example, using conventional methodologies, for example, in a case of radix-2 FFT, a number of radix-2 butterfly operations for completing N-point FFT is about $(N/2)*\log_2 N$, where $\log_2 N$ indicates the number of stages for FFT and $N/2$ is the number of butterflies in each stage. As such, typical FFT processors must perform many butterfly operations for the FFT computation. Thus, often parallel processing of butterfly operations is employed for many applications that require a high throughput.

Conventionally, FFT implementations tend to fall into one of two main architecture classes, serial-pipeline and memory-based classes. See references [1][2]. Serial-pipeline class or architectures generally require more hardware resources than memory-based class or architectures. In the memory-based architectures, multiple butterfly units can operate concurrently. Further, in the memory-based architecture, in-place algorithms are generally used for because of their lower resource requirements which leads to lower power requirements. See reference [3]. Further, in the FFT implementation, each stage of an FFT must read and then write back its entire data set or data sample, and each time in a different order, so that there are ample opportunities for memory-access conflicts in accessing and writing the data into the memory. Thus, it is critical to choose an optimal placement and access strategy for FFTs such that data can be fetched with zero conflicts so as to maximize performance while using a minimal area for data storage in memory.

Application specific integrated circuit (ASIC) based FFT designs to this date primarily focus on an area footprint of the design on hardware, which dictate use of a minimal amount of memory blocks. Thus, these designs target smaller single-ported memory rather than traditional multi-ported memory, which has been shown to reduce the physical size of required on-chip memory by 30%-53%. See reference [2]. However, since field programmable gate array (FPGA) is widely available as a pre-fabrication form, designers now have the flexibility of choosing various memory configurations with multiple parallel read and write ports of the memory. To build an efficient FFT, there is a need for using multiple SRAMs and placing the data such that butterfly units may fetch operations without conflict of addresses.

In FFT design, there are many challenges. By way of example, first, one of the most challenging problems for the FFT design is the address generation unit (AGU) that determines which data pair to read into a butterfly unit and to which block random access memory (BRAM) to write its output. Further, a typical FFT processor uses a read only memory (ROM) for storing twiddle factors. Thus, the twiddle factor generator (TFG) plays an important role in the FFT computations and various approaches for TFG have been proposed so far. One approach is to use a single ROM to hold pre-computed twiddle factors, see reference [11], and other approach is to use distributed ROM tables (see references [15][17]). Another approach for TFG is to calculate twiddle factors on the fly. See reference [16]. However, due to complexity of the computations, twiddle factor calculation on the fly may not be a practical option for achieving a high throughput FFT computation. As such, for many high throughput applications, storing the pre-computed twiddle factors in ROMs and retrieving them for the butterfly operations (or multiplications) have been the preferred approach for FPGA based FFT design. See reference [18].

Further, because of a large ROM lookup table needed for FFT with a large transform length such as 65,536 points, other efficient and low-cost twiddle factor generators have been proposed. See reference [18][19][20]. In one implementation, for a memory-based FFT processor using a single radix-2 butterfly, a single ROM may be used since it requires only one twiddle factor at a time. However, the address generation scheme processes multiple radix-2 butterflies in parallel, and thus, it requires two different twiddle factors at a time. Further, if it uses two ROMs with duplicated twiddle factors, the power consumption and footprint will also increase proportionally. As such, because of these shortcomings, there is a further need for a new improved technique for a memory distribution for twiddle factors.

Furthermore, in the FFT design, an AGU distributes symbol data into two memory banks for a single radix-2 butterfly design and thus only two inputs are accessed at the same time in each cycle. However, each stage of the radix-2 FFTs consists of N/2 butterfly operations. To speed up the computation, some or all the N/2 butterfly operations are performed in parallel, and as a result, the memories are divided into more banks for parallel access to data in the memories. For example, if an FFT processor employs four radix-2 butterflies, it accesses eight banks since each radix-2 butterfly requires two inputs. However, address generation schemes to date assume only a single butterfly for the FFT computation, and thus it requires many computation cycles in memory-based FFT processors. As a result, to apply a large number of radix-2 butterflies to a memory-based FFT processor without increasing memories and bank conflicts, a scheme is needed which divides memories into more banks, according to the number of butterflies used as the performance of the FFT processor increases linearly with the number of butterflies.

Further, the twiddle factor generation method distributes twiddle factors into different ROM banks, where the number of ROM banks is the same as the number of employed radix-2 butterflies. For example, if eight radix-2 butterflies are used, the ROM for the twiddle factors are partitioned into eight banks so that eight twiddle factors can be accessed at the same time. This tends to cause conflict in addressing. To this date, conflict free addressing schemes merely rely on twiddle factor table reduction by taking advantage of the symmetric property of the twiddle factor generation and avoiding recalculations of twiddle factors via conjugation and negation, both of which are costless operations, which reduce the number of twiddle factor reads from the memory by half. However, there is a need for a more improved technique for conflict free addressing schemes in consideration of the twiddle factor calculations to further improve and increase the efficiency of FFT.

SUMMARY

Various systems and methods for improving an efficiency of Fast Fourier Transform (FFT) algorithms in hardware and/or software, alone or in combinations of both, are disclosed herein. In some embodiments, in accordance with the present disclosure, an efficient FFT may be designed by using multiple static random access memories (SRAMs) and placing data such that butterfly units can fetch operands without conflict in addressing. The FFT deign operates on any given number of data sets (or data points), using any number of butterfly units operating in parallel, where each butterfly unit operates at any given pipeline depth. Also, the memory distribution schemes for twiddle factors according to the present disclosure are a hardware friendly option, due to simplicity of the conflict free address generation scheme. As such, in an aspect of the present disclosure, the twiddle factor table reduction strategies as well as computation complexity reduction strategies (or optimization strategies) may be combined such that address generation unit (AGU) and twiddle factor generation (TFG) can share the block random access memory (BRAM) resources on a given field programmable gate array (FPGA) and support concurrent butterfly operations without memory bank conflict.

In certain embodiments, an apparatus for FFT to be implemented in hardware is disclosed herein. The apparatus in an aspect of the present disclosure includes a radix-2 butterfly unit, a twiddle factor table coupled to the radix-2 butterfly unit, and an address generation unit coupled to the memory bank and the twiddle factor table. The radix-2 butterfly unit is configured to read data inputs from the memory bank and write data outputs to the memory bank after radix-2 multiplication. The address generation unit is configured to generate conflict free addresses of the memory bank during operation of the radix-2 butterfly unit.

In an aspect of the present disclosure, the memory bank may comprise at least two separate block random access memory (BRAM). Also, the apparatus may further include a plurality of multiplexer units (MUXes) disposed between the radix-2 butterfly unit and the memory bank.

In another aspect of the present disclosure, the twiddle factor table may be configured to store twiddle factors with a stride amount of an offset.

Further, in an aspect of the present disclosure, the hardware of the apparatus may include a FPGA.

In another aspect of the present disclosure, the conflict free addresses may be generated by the AGU based on incremental rotation of toggle bits over multiple stages of a state machine for a given FFT design.

In another aspect of the present disclosure, the radix-2 butterfly unit may be configured to include a three-stage pipelined operation such that multiple samples are processed concurrently.

In another aspect of the present disclosure, the memory bank may be configured to include a pipelined read enabled memory block.

In another aspect of the present disclosure, a bit width of data may be reduced based on a size for each sample received from an analog-to-digital converter (ADC).

In another aspect of the present disclosure, the radix-2 butterfly unit may include a plurality of radix-2 butterfly units disposed in parallel.

In another aspect of the present disclosure, the apparatus may further include a lane controller configured to output data samples into a plurality of FFT lanes running in parallel.

In another aspect of the present disclosure, a number of the FFT lanes may be determined based on at least one of: a memory bank utilization, a critical path delay, or a throughput.

BRIEF DESCRIPTION OF DRAWINGS

The followings are brief descriptions of accompanying drawings. The drawing figures depict one or more implementations in accordance with the present teachings, by way of example only, not by way of limitation. In the figures, like reference numerals refer to the same or similar elements.

FIG. 2A is a pseudo code conceptually illustrating an embodiment of the present technology in accordance with an aspect of the present disclosure;

DETAILED DESCRIPTION OF EMBODIMENTS

Figure 1:
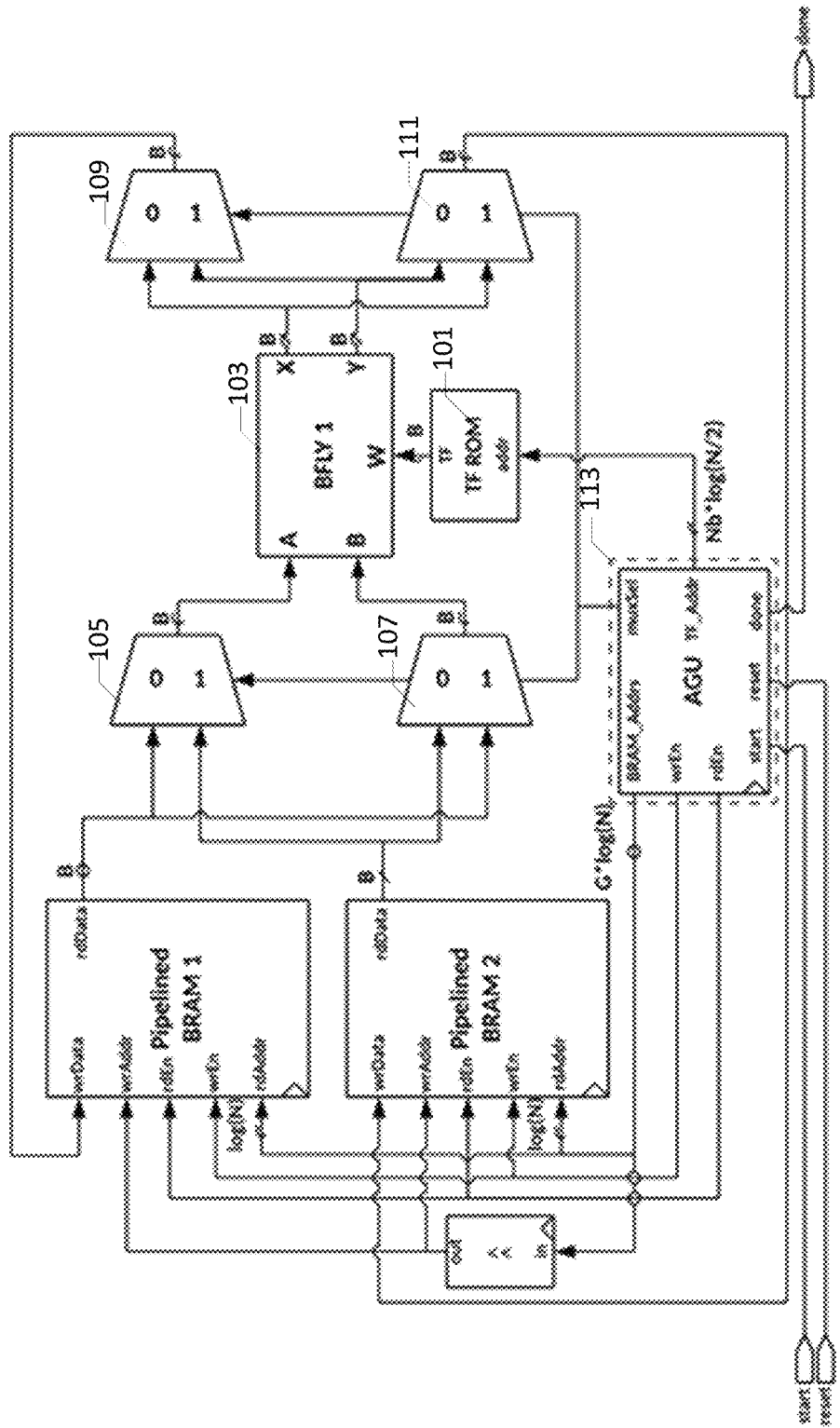
FIG. 1 is a conceptual diagram conceptually illustrating an embodiment of the present technology in accordance with an aspect of the present disclosure.

The detailed description of illustrative examples will now be set forth below in connection with the various drawings. The description below is intended to be exemplary and in no way limit the scope of the present technology. It provides a detailed example of possible implementation and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts. It is noted that like reference numerals are used in the drawings to denote like elements and features.

Further, methods and devices that implement example embodiments of various features of the present technology are described herein. Reference in the description herein to "one embodiment" or "an embodiment" is intended to indicate that a particular feature, structure, or characteristic described in connection with the example embodiments is included in at least an embodiment of the present technology or disclosure. The phrases "in one embodiment" or "an embodiment" in various places in the description herein are not necessarily all referring to the same embodiment.

In the following description, specific details are given to provide a thorough understanding of the example embodiments. However, it will be understood by one of ordinary skill in the art that the example embodiments may be practiced without these specific details. Well-known circuits, structures and techniques may not be shown in detail in order not to obscure the example embodiments (e.g., circuits in block diagrams, etc.).

In digital signal processing, Discrete Fourier Transform (DFT) plays a significant role in many applications such as filtering, time domain analysis, frequency domain analysis, spectral analysis, etc. The DFT is used to convert an analog signal into a series of discrete signals by sampling the analog signal, which leads to a large number of calculations and memory operations and as such the DFT is not computationally efficient. To address the computational issue of the DFT, Fast Fourier Transform (FFT) and Inverse Fast Fourier Transform (IFFT) have been developed and provide efficient algorithms to take advantage of the DFT. As such, to achieve more efficiency, FFT and/or IFFT calculations are often implemented in hardware such as microcontroller, field programmable gate array (FPGA), application specific integrated circuit (ASIC), application processor, etc. in conjunction with one or more memory banks for data storage and use for computation.

In accordance with an aspect of the present technology, FIG. 1 is a high-level block diagram conceptually illustrating a baseline architecture that involves a single butterfly unit. It is noted that although for the purpose of explanation, the baseline architecture is shown in digital blocks that are commonly implemented in FPGA, the baseline architecture may be implemented in various forms including microcontrollers, ASIC, general digital logics, software, etc. or any combinations.

In FIG. 1, by way of example, a 64K-point FFT is assumed to be carried out by the baseline architecture. As such, the example includes various components such as address generation unit (AGU) 113, block random access memories (BRAMs), multiplexers 105, 107, 109, 111, a butterfly unit (BFLY1) 103, and a twiddle factor storage (TF ROM) 101. The TF ROM 101 is configured to store twiddle factors for the FFT (e.g., twiddle factors for the 64K-point FFT) and is coupled to the AGU 113 and the butterfly unit 103. In the example, the butterfly unit (e.g., BFLY 1) 103 is configured to read input samples, via input ports A and B, from BRAM 1 and BRAM 2 in parallel, and, after radix-2 multiplication for FFT, write its output values, via output ports X and Y, to BRAM 1 and BRAM2. In the 64K-point FFT, 16 stages are required and at each stage there are 32K butterfly operations that are to be carried iteratively. The order of data reads from the BRAM 1 and BRAM2 will vary depending on the stage number and the iteration number. As such, in the example, a pair of multiplexers such as 2:1 MUXes (e.g., 105 and 107) are used to channel the data read from the BRAM1 and BRAM 2 to corresponding input ports A and B of the butterfly unit 103. Similarly, another pair of multiplexers such as 2:1 MUXes (e.g., 109 and 111) are used to write the data back to the BRAM 1 and BRAM 2, as shown in FIG. 1. In an aspect of the present disclosure, the AGU 113 is configured to implement one or more conflict free address generation algorithms for large scale FFT implementation, which is further illustrated in FIG. 2A.

FIG. 2A is a pseudo code for generation conflict free addresses of memory locations in a memory bank such as BRAM 1 and BRAM 2 for FFT with D data points. A loop unrolling in each stage of a butterfly operation may be used to enable multiple parallel addresses to be generated at once.

In one implementation, an expression for the inner loop of a first section from "for each index i=0 to D−1" may be changed to "for each index i=0; i<D−1; i=i+G" where G is a stride amount, which is an unrolling factor. In an aspect of the present disclosure, by implementing this loop mechanism and adding constants of 0, 1, . . . , G−1 in parallel, savings in hardware resource may be obtained between the two stages. As such, this optimization may also reduce a comparator count, an incrementer count, and other state machine logic.

As mentioned above, the pseudo code shown in FIG. 2A illustrates an algorithm for implementing a conflict free address generation scheme in accordance with an aspect of the present disclosure. The pseudo code may be implemented in hardware such as logic blocs, circuits, or software or combinations of both hardware and software. In the example, the algorithm for a conflict free address generation is implemented the address generation unit, in accordance with an aspect of the present disclosure.

Referring to the pseudo code for the algorithm, for a group G of data points having a size of D (e.g., 16), a group size may be set to equal to B*R, where R is a radix size (e.g., 2) and B is the number of butterfly units (e.g., 4). Thus, for a 16-point FFF, e.g., D=16, the number of stages is set to S=log 2(D)=log 2(16=2⁴)=4. In the present disclosure, unless defined otherwise, D refers to the number of data points, G refers to the group size, S refers to the number of stages (S=log₂(D)), B refers to the number of butterfly units, T refers to the number of toggle bits (T=log₂(G)), d refers to an index.

Further, the pseudo-code for conflict free address generation algorithm is designed for any size FFT with any number of butterflies. In an aspect of the present disclosure, the algorithm shown in FIG. 2A may be implemented with a state machine with 3 stages. The first stage (e.g., S=0) indicates that the FFT engine is not active. When a sample arrives, the "start" input enables the computations by moving to the second stage (e.g., S=1) in the state machine. This second stage corresponds to controlling the hardware implementation of the first nested for-loop in FIG. 2A. While the condition of "s<(S−T)" is satisfied, the state machine remains in the second stage. The group size (G) also defines the unrolling factor in the nested for-loop. Based on this looping factor, in hardware the implementation may be further illustrated as follows:

for each stage $s = 0$ to $S - T$ for each index $i = 0$ to $(D - 1)/G$ $d[s, i] = \text{left\_rotate}(i, s)$ $d[s, i + 1] = \text{left\_rotate}(i + 1, s)$ $d[s, i + 2] = \text{left\_rotate}(i + 2, s)$

...

$d[s, i + G - 1] = \text{left\_rotate}(i + G - 1, s)$

By way of example, for a case of 32-point FFT, if the group size G is set to 8, the execution flow may be shown as in Table 1 below. Table 1 shows a table of sample and memory bank access patterns for 32-point FFT using four butterfly units (D=32, B=4, G=8, T=3 and S=5).

TABLE 1

Conflict Free Address Generation for 32-point FFT
32 Pt FFT, 4 BFLYs: Sample + Memory Bank Access Patterns
B = 4, G = 8, T = 3, S = 5, D = 32

| Sample Number | Memory Number |
|---|---|
| Stage 0 | |
| 0 | 0 |
| 1 | 1 |
| 2 | 2 |
| 3 | 3 |
| 4 | 4 |
| 5 | 5 |
| 6 | 6 |
| 7 | 7 |
| 8 | 1 |
| 9 | 0 |
| 10 | 3 |
| 11 | 2 |
| 12 | 5 |
| 13 | 4 |
| 14 | 7 |
| 15 | 6 |
| 16 | 2 |
| 17 | 3 |
| 18 | 0 |
| 19 | 1 |
| 20 | 6 |
| 21 | 7 |
| 22 | 4 |
| 23 | 5 |
| 24 | 3 |
| 25 | 2 |
| 26 | 1 |
| 27 | 0 |
| 28 | 7 |
| 29 | 6 |
| 30 | 5 |
| 31 | 4 |
| Stage 1 | |
| 0 | 0 |
| 2 | 2 |
| 4 | 4 |
| 6 | 6 |
| 8 | 1 |
| 10 | 3 |
| 12 | 5 |
| 14 | 7 |
| 16 | 2 |
| 18 | 0 |
| 20 | 6 |
| 22 | 4 |
| 24 | 3 |
| 26 | 1 |
| 28 | 7 |
| 30 | 5 |
| 1 | 1 |
| 3 | 3 |
| 5 | 5 |
| 7 | 7 |
| 9 | 0 |
| 11 | 2 |
| 13 | 4 |
| 15 | 6 |
| 17 | 3 |
| 19 | 1 |
| 21 | 7 |
| 23 | 5 |
| 25 | 2 |
| 27 | 0 |
| 29 | 6 |
| 31 | 4 |
| Stage 2 | |
| 0 | 0 |
| 4 | 4 |
| 8 | 1 |
| 12 | 5 |
| 16 | 2 |
| 20 | 6 |
| 24 | 3 |
| 28 | 7 |
| 1 | 1 |
| 5 | 5 |
| 9 | 0 |
| 13 | 4 |
| 17 | 3 |
| 21 | 7 |
| 25 | 2 |
| 29 | 6 |
| 2 | 2 |
| 6 | 6 |
| 10 | 3 |
| 14 | 7 |
| 18 | 0 |
| 22 | 4 |
| 26 | 1 |
| 30 | 5 |
| 3 | 3 |
| 7 | 7 |
| 11 | 2 |
| 15 | 6 |
| 19 | 1 |
| 23 | 5 |
| 27 | 0 |
| 31 | 4 |
| Stage 3 | |
| 0 | 0 |
| 8 | 1 |
| 16 | 2 |
| 24 | 3 |
| 4 | 4 |
| 12 | 5 |
| 20 | 6 |
| 28 | 7 |
| 1 | 1 |
| 9 | 0 |
| 17 | 3 |
| 25 | 2 |
| 5 | 5 |
| 13 | 4 |
| 21 | 7 |
| 29 | 6 |
| 2 | 2 |
| 10 | 3 |
| 18 | 0 |
| 26 | 1 |
| 6 | 6 |
| 14 | 7 |
| 22 | 4 |
| 30 | 5 |
| 3 | 3 |
| 11 | 2 |
| 19 | 1 |
| 27 | 0 |
| 7 | 7 |
| 15 | 6 |
| 23 | 5 |
| 31 | 4 |
| Stage 4 | |
| 0 | 0 |
| 16 | 2 |
| 4 | 4 |
| 20 | 6 |
| 8 | 1 |
| 24 | 3 |
| 12 | 5 |
| 28 | 7 |

TABLE 1-continued

Conflict Free Address Generation for 32-point FFT
32 Pt FFT, 4 BFLYs: Sample + Memory Bank Access Patterns
B = 4, G = 8, T = 3, S = 5, D = 32

| Sample Number | Memory Number |
|---|---|
| 1 | 2 |
| 17 | 0 |
| 8 | 6 |
| 21 | 4 |
| 9 | 3 |
| 25 | 1 |
| 13 | 7 |
| 29 | 5 |
| 2 | 1 |
| 18 | 3 |
| 6 | 5 |
| 22 | 7 |
| 10 | 0 |
| 26 | 2 |
| 14 | 4 |
| 30 | 6 |
| 3 | 3 |
| 19 | 1 |
| 7 | 7 |
| 23 | 5 |
| 11 | 2 |
| 27 | 0 |
| 15 | 6 |
| 31 | 4 |

In Table 1 above, each column corresponds to the "s" variable in the nested-for-loop (e.g., s=0, 1, 2, 3, 4) and defines the stages of the FFT execution. Since the group size G is 8, samples are grouped into each group having 8 samples (indicated with the dashed lines in Table 1). The "(D−1)/G" term with 32 samples using groups of 8 corresponds to 4 iterations of the loop with indices 0 to 3 in a column wise direction. The 32-point FFT is completed in 5 stages, e.g., Stage 0 (S0) to Stage 4 (S4) in the illustrated example in a row-wise direction. Thus, columns S0 and S1 correspond to the first nested for-loop ("s=0 to S−T") in the algorithm. As seen in Table 1 above, it is noted that as long as within the group of 8 samples, the corresponding addresses to access them are unique, and thus conflict free memory access may be ensured.

In an aspect of the present disclosure, in the example shown in FIG. 2A, the left-rotate operation is a mechanism for achieving the conflict free address generation. Table 1 shows that within each group of 8 elements for any stage S, there are two pairs in each row (e.g., sample number and memory number). The first number (e.g., the sample number) is a sample index generated after the rotate operation, and the second number (e.g., the memory number) is a corresponding memory bank storing that value. To further illustrate, within the S column (e.g., for Stage 0), in the first iteration, addresses of memory numbers are generated in sequence 0, 1, 2, 3, 4, 5, 6, 7. In the second iteration, neighboring address values are switched resulting with 1, 0, 3, 2, 5, 4, 7, 6 in memory number. In the third iteration, it is to flip at pairs of 4 samples level first (3, 2, 1, 0, 7, 6, 5, 4) and then flip at pairs of two level resulting with 2, 3, 0, 1, 6, 7, 4, 5 in memory number. Finally, in the fourth iteration, it is to switch pairs of neighboring elements resulting with 3, 2, 0, 1, 7, 6, 5, 4 in memory number.

In the example, for the second stage (e.g., Stage 1), when the iteration is done twice, the following after the third iteration is obtained:

1 3 5 7 9 11 13 15—First column (Sample Number)
1 3 5 7 0 2 4 6—Second column (Memory Number)

The values in the first column are generated with the left rotate operation. For example, 1 is the result of left rotate operation on i=16 by 1 since S is 1. Similarly, 3 is the result of left rotate operation on i=17 by 1. The second column of addresses are generated through an XOR operation. By way of example, for the value of 11 (01011), T is 3 (e.g., T=log G=log 8=3). Starting from right most bit in steps of 3, XOR is performed on bit index in strides of 3, meaning (b4, b3, b2, b1, b0), b0 is XORed with b3 that becomes the least significant bit (LSB) and then b1 is XORed with b4 which becomes the second bit. Finally, b2 is the remaining element which becomes the third bit. Altogether, 01011 with T=3 becomes (or translated) into 010 (which is 2).

After completing Stage 1 of Table 1 above, the state machine moves the stage 3 where the nested loop (e.g., three for-loops) of FIG. 2A is implemented. In one aspect of the present disclosure, the innermost loop (e.g., for each togbits t=0 to (G−1)) may be completely unrolled in hardware implementation. The left rotation in stage is identical to the left rotate behavior in stage 2 (e.g., Stage 2). For the 32-points FFT with G=8, lo_bits value ranges from 0 to 3. This corresponds to "i" used in the previous stage in hardware implementation. As such, complete conflict free address generation for memory bank access may be obtained for the 32-point FFT.

In another implementation, conflict free address generation for a 16-point FFT may also be implemented easily in accordance with an aspect of the present disclosure. By way of example, the conflict free address generation for the 16-point FFT is illustrated in Table 2, which may be implemented across four (4) stages based on present technology disclosed herein.

TABLE 1

| Conflict Free Address Generation Across 4 Stages of the 16-point FFT | | | |
|---|---|---|---|
| STAGE 0 (toggle bits = $d_2d_1d_0$) dp[d] $d_3d_2d_1d_0$ | STAGE 1 (toggle bits = $d_3d_2d_1$) dp[d] $d_3d_2d_1d_0$ | STAGE 2 (toggle bits = $d_1d_3d_2$) dp[d] $d_3d_2d_1d_0$ | STAGE 3 (toggle bits = $d_2d_1d_3$) dp[d] $d_3d_2d_1d_0$ |
| dp[0] 0000 | dp[1] 0000 | dp[0] 0000 | dp[0] 0000 |
| dp[1] 0001 | dp[2] 0010 | dp[4] 0100 | dp[8] 1000 |
| dp[2] 0010 | dp[4] 0100 | dp[8] 1000 | dp[2] 0010 |
| dp[3] 0011 | dp[6] 0110 | dp[12] 1100 | dp[10] 1010 |
| dp[4] 0100 | dp[8] 1000 | dp[2] 0010 | dp[4] 0100 |
| dp[5] 0101 | dp[10] 1010 | dp[6] 0110 | dp[12] 1100 |
| dp[6] 0110 | dp[12] 1100 | dp[10] 1010 | dp[6] 0110 |
| dp[7] 0111 | dp[14] 1110 | dp[14] 1110 | dp[14] 1110 |

TABLE 1-continued

Conflict Free Address Generation Across 4 Stages of the 16-point FFT

| STAGE 0 (toggle bits = $d_2d_1d_0$) dp[d] $d_3d_2d_1d_0$ | STAGE 1 (toggle bits = $d_3d_2d_1$) dp[d] $d_3d_2d_1d_0$ | STAGE 2 (toggle bits = $d_1d_3d_2$) dp[d] $d_3d_2d_1d_0$ | STAGE 3 (toggle bits = $d_2d_1d_3$) dp[d] $d_3d_2d_1d_0$ |
|---|---|---|---|
| dp[8]  1<u>000</u> | dp[1]  0<u>001</u> | dp[1]  00<u>0</u>1 | dp[1]  000<u>1</u> |
| dp[9]  1<u>001</u> | dp[3]  0<u>011</u> | dp[5]  01<u>0</u>1 | dp[9]  100<u>1</u> |
| dp[10] 1<u>010</u> | dp[5]  0<u>101</u> | dp[9]  10<u>0</u>1 | dp[3]  001<u>1</u> |
| dp[11] 1<u>011</u> | dp[7]  0<u>111</u> | dp[13] 11<u>0</u>1 | dp[11] 101<u>1</u> |
| dp[12] 1<u>100</u> | dp[9]  1<u>001</u> | dp[3]  00<u>1</u>1 | dp[5]  010<u>1</u> |
| dp[13] 1<u>101</u> | dp[11] 1<u>011</u> | dp[7]  01<u>1</u>1 | dp[13] 110<u>1</u> |
| dp[14] 1<u>110</u> | dp[13] 1<u>101</u> | dp[11] 10<u>1</u>1 | dp[7]  011<u>1</u> |
| dp[15] 1<u>111</u> | dp[15] 1<u>111</u> | dp[15] 11<u>1</u>1 | dp[15] 111<u>1</u> |

As such, conflict free address generation for FFT may be accomplished for any size FFT without increasing memories and bank conflicts, in an aspect of the present disclosure.

Figure 2B:
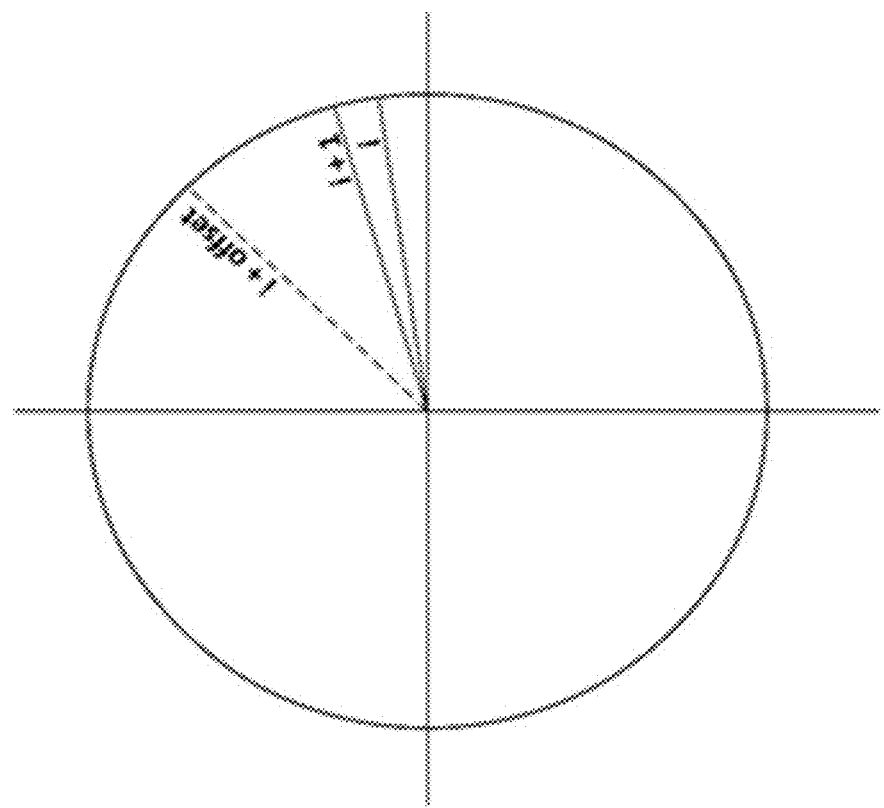
FIG. 2B is a diagram conceptually illustrating an embodiment of the present technology in accordance with an aspect of the present disclosure.

Further, to improve the efficiency of FFT design, one or more optimization strategies may be combined with or carried out, in addition to the conflict free address generation for the FFT design. By way of example, the one or more optimization strategies may include a strategy of reducing twiddle factor table size. In an aspect of the present disclosure, the size of a twiddle factor table may be reduced with a stride, as shown in FIG. 2B. That is, the twiddle factors may be stored with a stride amount of an "offset," thereby further reducing the size of twiddle factor table. Experimentally, in one implementation, it has been observed that using a stride of 4 does not sacrifice the accuracy of 64K-point FFT, and thus it allows one to reduce the size of the twiddle factor table by a factor of 4. As such, in an aspect of the present disclosure, in addition to the conflict free address generation for FFT, an optimization strategy of reducing the twiddle factor table size may be combined to further increase the efficiency of FFT design.

Figure 3:
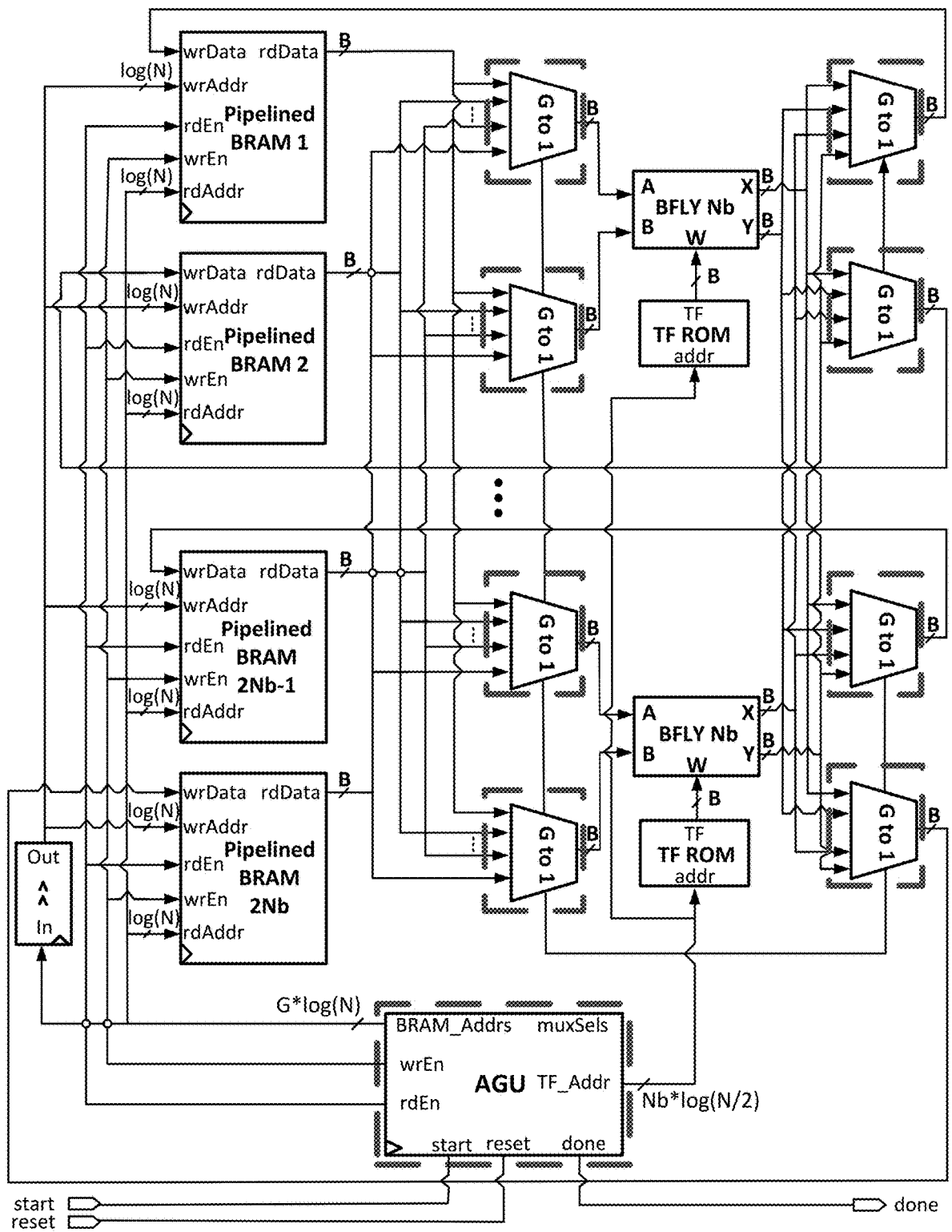
FIG. 3 is a diagram conceptually illustrating an example embodiment of the present technology in accordance with an aspect of the present disclosure.

Further, the efficiency of FFT design may be increased by using or combining with another optimization strategy; that is, parallel processing schemes. FIG. 3 is a diagram of a design conceptually illustrating an iterative process using N number of butterfly units (e.g., BFLY1, ..., BFLYNb), in accordance with an aspect of the present disclosure. The N number of butterfly units may reduce the count of iterations (e.g., the iteration count) in a given stage by a factor of N. Further, as shown in FIG. 3, the example illustrates a parallel design that includes a plurality of memories (e.g., BRAM1, ..., BRAM2Nb) and a plurality of multiplexers such as G: 1 MUXes. Further, the number of BRAMs, the number of MUXes and the size of each MUX change may be based in part on the number of butterfly units used. That is, for each butterfly unit, two BRAMS and 2 MUXes are required. As such, for N butterfly design, it is possible to anticipate that the N butterfly design requires 2N BRAMs and 2N MUXes, where each MUX is of size 2N: 1.

By way of example, in one implementation, a design with 8 butterfly units may thus require 16 BRAMs, 16 MUXes of 16:1 MUX. Also, on commercially available hardware such as Virtex-7 architecture, a single slice may implement a MUX with up to 16 inputs. If the size of MUX grows beyond this number, larger MUXes may be implemented using multiple slices using routing resources which in turn may result in increased critical path delay.

In an aspect of the present disclosure, various optimization strategies may be combined with each other for further improvements and increased efficiency of the FFT design.

The present technology may include one or more of the optimization strategies disclosed herein.

In other words, in addition to the baseline optimization strategy of the present disclosure, different optimization strategies may be combined with each other to increase the performance of the FFT design. Some additional optimization strategies as well as the baseline architecture optimization may be summarized in Table 3 below.

TABLE 3

Additional Optimization Strategy over Baseline Architecture

| Strategy | Optimization Strategy or Methods |
|---|---|
| A | Pipelining the butterfly operation |
| B | Pipelining the read/write operations |
| C | Bitwidth vs Precision |
| D | N number of parallel butterflies |
| E | Twiddle factor reductions (via BRAM reduction) |
| F | Pipelining the address generation unit (AGU) |
| G | N-lane based design for parallel FFT |

Figure 4:
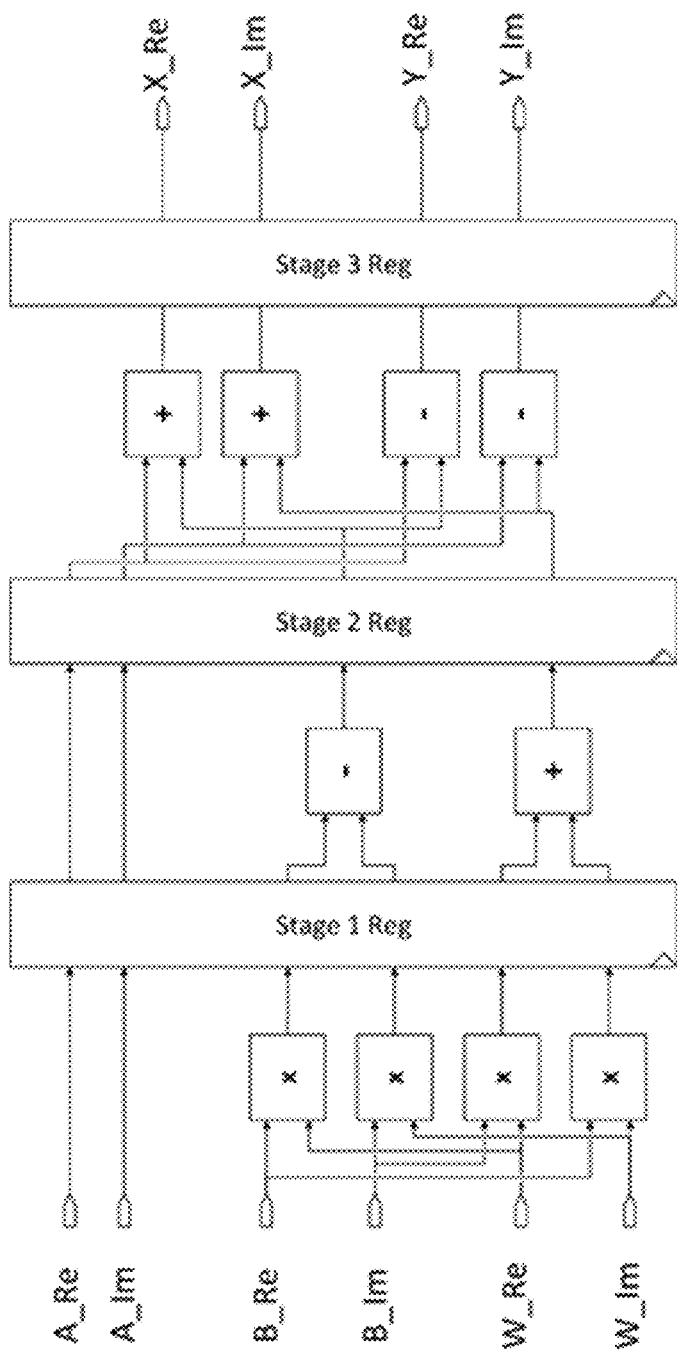
FIG. 4 is a diagram conceptually illustrating an example embodiment of the present technology in accordance with an aspect of the present disclosure.

Strategy A: Pipelining butterfly operation. In an aspect of the present disclosure, by way of example, the butterfly operation may be pipelined to further improve the efficiency of the FFT design. In an aspect of the present disclosure, FIG. 4 illustrates an example execution flow of a butterfly function that may be partitioned into three (3) stages. As shown in the example of FIG. 4, the butterfly function may include various operations including multiply ("×"), subtract ("−") and accumulate ("+") operations on real (_RE) and imaginary (IM) values for inputs A and B, along with the twiddle factor input (W). In the example, this 3-stage pipelining of the butterfly function allows concurrent processing of multiple samples and is expected to improve the throughput of a system by at least a factor of 3. As such, in an aspect of the present disclosure, in addition to the baseline architecture and/or other optimization strategies, the pipelining of the butterfly operation may be combined to further improve and/or increase the efficiency of the FFT design.

Figure 5:
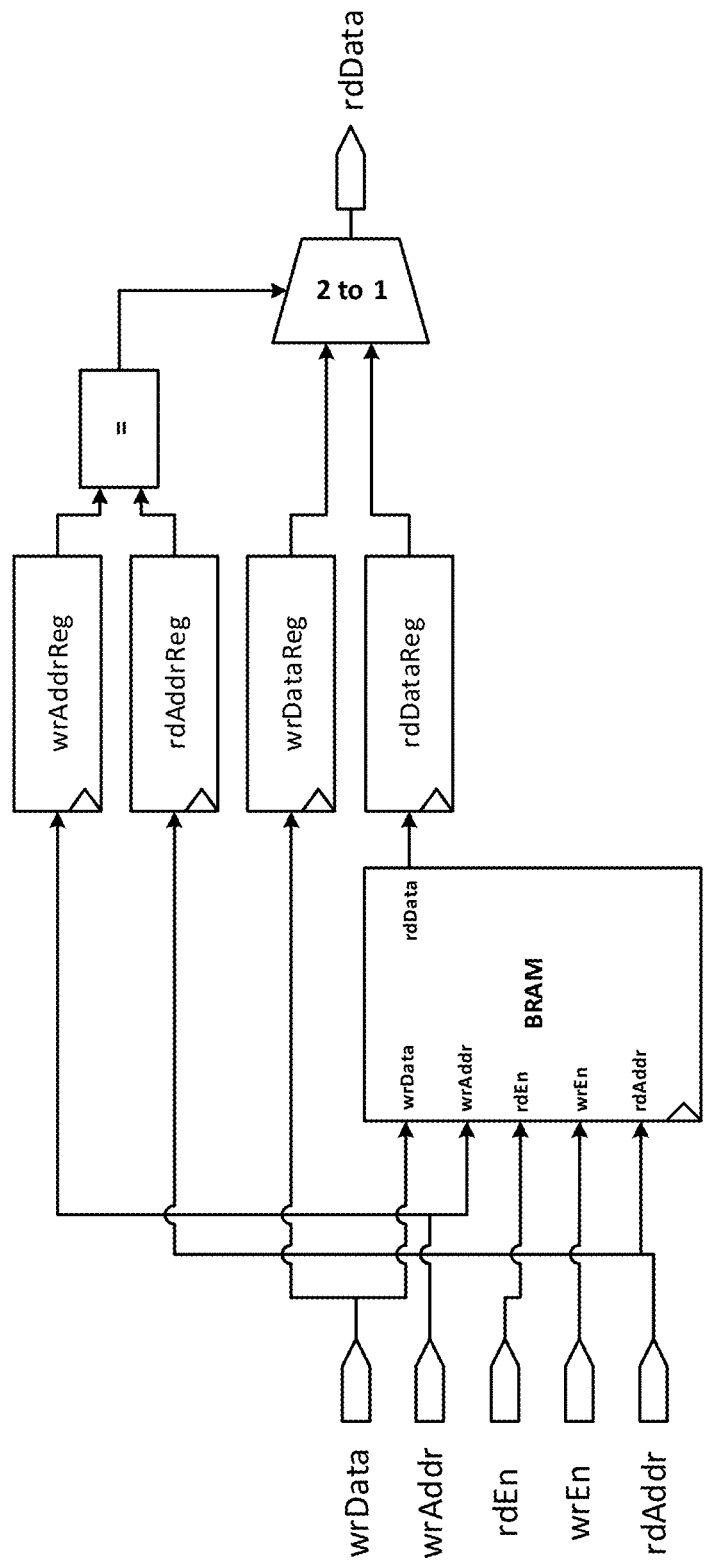
FIG. 5 is a diagram conceptually illustrating an example embodiment of the present technology in accordance with an aspect of the present disclosure.

Strategy B: Pipelining the read/write operation. In another aspect of the present disclosure, by way of example, the read operation into a memory bank may be pipelined to further increase the efficiency of the FFT design. FIG. 5 provides a block diagram conceptually illustrating an example pipelining of such a read operation. In one embodiment, FIG. 5 illustrates a pipelined read enabled BRAM block. Also, in the example, it is assumed that the FFT design involves 8 butterfly units and for a given stage and in a given iteration, after one of the 8 butterfly units processes A and B inputs, the resulting value (X) may be written back to its designated BRAM. In the subsequent iteration, one of the 8 butterfly units may read from the BRAM that was written during the previous iteration. In the example, in order to ensure that writes from the previous iteration occur before the read operations of the current iteration, a 2-stage pipeline may be employed for reading data from a BRAM into a butterfly as shown in FIG. 5.

In the example, the 2:1 MUX allows choosing between the data that is being written (e.g., wrDataReg) and the data that has already been written into the BRAM (e.g., rdDataReg). It is noted that the true benefit of this pipelining may occur when the current butterfly is not using the value that was written in the previous cycle. With this technique of pipelining of the read operation, the datapath may turn into a truly pipelined flow with a throughput improvement factor of at least 2×. However, since the dependencies occur in the FFT flow, the expected benefit may be less than 2× in the case. Nonetheless, in an aspect of the present disclosure, in addition to the baseline architecture and/or other optimization strategies, the pipelining of the read operation into the memory bank may be combined with other strategies, as described herein, to further improve and increase the efficiency of the FFT design.

Further, in another aspect of the present disclosure, it is assumed that a write operation to a specific address is followed by a read operation from the same address in the same BRAM. In the case as shown in FIG. 5, the top comparator (=) module detects the dependency by checking the equality of read and write addresses. If there is a match, then the 2:1 MUX chooses the "wrDataReg" register contents which are configured to store the value being written into the BRAM module. In this way, without having to wait for the BRAM write operation to be completed, the same data may be used to serve the subsequent read operation. This forwarding process may save at least 1 cycle latency and prevent other butterfly units that may be dependent on this write operation followed by a read operation from stalling.

Furthermore, for the cases where there is no dependency between writes followed by read operations, this pipelined datapath may allow the data to be read from the BRAM module and stored in the intermediate register "rdDataReg" realizing a pipelined fashion of execution. This naturally becomes a 2-stage pipelined design which significantly improves the throughput, given that most of the writes followed by read operations are independent for the FFT. As such, in an aspect of the present disclosure, in addition to the baseline architecture and/or other optimization strategies, the 2-stage pipelining may be used to further improve and/or increase the efficiency of the FFT design.

Strategy C: Bitwidth vs Precision. Another optimization strategy based on bitwidth may be combined to further improve and increase the efficiency of the FFT design. In an aspect of the present disclosure, a bitwidth of sample data may be used for an optimization approach. The bitwidth of the sample data determines the size of a bus structure that connects the memory bank or BRAM modules, butterfly units, and MUXes. Further, each sample is stored in the BRAM module. By way of example, considering the 64K samples, changing the bitwidth of the data may have a direct impact on the amount of BRAM modules used in the design. In one implementation, a target FPGAs in a system may have a total of 1,470 of BRAMs each with 36K bits. Before reducing the bitwidth, precision need be carefully taken into account for. For example, an initial design may have 64-bit real and 64-bit imaginary for each sample, but after observing that 16-bit is the largest size for each sample from an analog-to-digital (ADC) unit, 12 fraction bits, 3 integer and 1 sign bit may be used for each real and imaginary component of a sample. As such, the reduced bitwidth may be sufficient to avoid overflows and support the precision with 12-bits. Thus, in an aspect of the present disclosure, in addition to the baseline architecture and/or other optimization strategies, the reduced bitwidth in consideration of precision in accordance with an aspect of the present disclosure may be combined with other strategies to further improve and increase the efficiency of the FFT design.

Further, various optimization strategies may be combined to achieve improvement in performance of the FFT design. That is, as mentioned above, the optimization strategies shown in Table 1 above may be applied over the baseline architecture shown in FIG. 1. Tables 4 and 5 illustrate respective performance improvement when one or more optimization strategies are employed together.

Table 4 summarizes the resources available in a target FPGA (e.g., XC7VX690T). Table 5 summarizes performance analysis of optimizations applied over the baseline architecture (e.g., the baseline implementation with 1 butterfly unit).

TABLE 4

| XC7VX690T Resources | | | | | |
|---|---|---|---|---|---|
| | BRAM | LUT | LUT RAM | FlipFlop | DSP |
| Virtex7 | 1470 | 433200 | 174200 | 866400 | 3600 |

TABLE 5

Performance Analysis of Optimizations Strategies of Table 3 Applied Over Baseline Architecture

| Version | # of bflys | Total cycles | Critical path delay (nsec) | Total time (sec) | FFTs/ second | Gigasamples/ second | Speedup |
|---|---|---|---|---|---|---|---|
| Baseline Architecture | 1 | 524290 | 29.5 | 0.015467 | 64.65564 | 0.00423727 | 1 |
| Optimizations A, B, C | 1 | 524293 | 6.879 | 0.003607 | 277.2686 | 0.01817107 | 4.3 |
| Optimizations A, B, C, D | 2 | 262150 | 5.706 | 0.00150 | 668.5 | 0.0438 | 10.3 |
| Optimizations A, B, C, D | 4 | 131078 | 6.159 | 0.00080 | 1238.7 | 0.0811 | 19.2 |
| Optimizations A, B, C, D | 8 | 65542 | 7.9 | 0.000518 | 1931.315 | 0.12657069 | 29.9 |

As shown in Table 5, the baseline architecture (as shown in FIG. 1) may have a critical path delay of 29.5 nanoseconds (ns) and a total execution time of 0.0155 second for 64K-point FFT. This corresponds to a 0.004 Giga samples/second throughput. In the example, it is assumed that a target throughput is a 0.12 Giga samples/second throughput for the 64K-point FFT design. Various optimization strategies may be applied to the baseline architecture. After applying the pipelining and bitwidth based optimizations (strategies A, B, and C of Table 3), it is noted that a speedup factor of 4.3 may be achieved, compared to the baseline implementation. Considering the 5-stage pipeline (3 stage butterfly and 2 stage read pipeline), and read pipeline is effective only when there is no dependency between iterations, achieving a 4.3× speedup confirms that the pipelining method is delivering the expected performance improvement, thereby reducing the critical path delay from 29.5 ns to 6.879 ns with the pipelining.

However, further optimization is possible and other optimization strategies may be applied in addition to those. By way of example, the number of butterfly units may be increased to improve and increase the performance metrics of the FFT design. That is, the last row in Table 5 shows the FFT design with 8 butterfly units coupled with pipelining and bitwidth optimizations. As shown in Table 5, the expected speedup factor is about 30, compared to the optimized single butterfly design; however, it is observed to have 6.95× improvement. This is due to an increase in critical path delay (e.g., 7.9 ns) with the use of larger MUXes in the design. That is, instead of using 2:1 MUX, 8-butterfly based design uses 16:1 MUX. This is also reflected in the resource usage analysis shown in Table 6 below in LUT column. LUTs are used for implementing the soft logic such as the MUXes in a given design. For a single butterfly design, only a 0.1% of the LUT resources is used, however, for the 8-butterfly design, a 4.8% of the LUT resource is used primarily due to larger MUXes needed in the design. Also, as shown in Table 5, the throughput with the 8-butterfly design is now 0.127 Giga samples/second, which is about 30× improvement over the baseline architecture.

Table 6 below shows resource utilization of 1 Butterfly (BFLY) and 8 Butterfly based designs after carrying out optimization strategies A, B, and C.

TABLE 6

| | Resource Utilization Resource Usage (%) | | | | |
|---|---|---|---|---|---|
| BFLY | BRAM | LUT | LUT RAM | FlipFlop | DSP |
| 1 | 7.76 | 0.1 | 0.02 | 0.07 | 0.11 |
| 2 | 5.51 | 0.3 | 0.04 | 0.13 | 0.22 |
| 4 | 6.12 | 1.05 | 0.07 | 0.25 | 0.44 |
| 8 | 11 | 4.8 | 0.8 | 0.9 | 0.89 |

As shown in Table 6, 8-Butterfly based design uses a 11% of the BRAMs. If the design is replicated N times to process N signals of 64K-points in parallel, the resource usage will increase linearly. Further, in theory, the design with 10 lanes will improve the throughput linearly delivering 1.26 Gsamples/second. However, it is possible to have a maximum of 9 lanes with expected BRAM utilization of 99% (=9*11%) based on the current 8 butterfly-based design. With 9 lanes, even with the assumption of ideal performance gain of 9×, it is possible to achieve only 1.14 (=9*0.127) Gsamples/second. Due to a larger size of circuit, it is possible to expect a critical path delay to be longer for the multiple lane-based design, and thus it may require more than 10 lanes to compensate for that loss and sustain 1.2 Gsamples/second. Further, as the preprocessing of incoming signals will involve the filtering process that will require hardware resources in terms of BRAMs and LUTs, the degree of parallelism should be limited so that there are enough hardware resources to implement the preprocessing functions. Thus, it may be possible to keep the BRAM usage below 80% to leave space for the filters.

In an aspect of the present disclosure, as mentioned earlier, it may be possible to combine with other optimization strategies. If the BRAM usage is reduced, the number of lanes can be increased. Conventionally, all twiddle factors for the 64K-point FFT may be stored in the BRAM and it is known that a stride of 4 is a suitable technique for twiddle factor table reduction for the 64K-point FFT. Based on the optimization strategy E (twiddle factor reduction) in Table 3, it may be determined that the BRAM usage may be reduced from 11% to 6.51% without impacting other resource usage ratios as shown in Table 7. As such, the number of lanes may be increased.

TABLE 7

| Resource utilization of 1 butterfly (BHA) and 8 Butterfly-based designs after optimizations A, B, and C, D and E Resource Usage (%) | | | | | |
|---|---|---|---|---|---|
| BFLY | BRAM | LUT | LUT RAM | Flip Flop | DSP |
| 1 | 7.76 | 0.1 | 0.02 | 0.07 | 0.11 |
| 8 | 11 | 4.8 | 0.8 | 0.9 | 0.89 |
| 8 with optimization E | 6.53 | 4.02 | 0.11 | 0.50 | 0.89 |
| 8 with optimization E, F | 6.80 | 4.86 | 0.11 | 0.58 | 0.89 |

As shown in Table 8, with the twiddle factor table reduction (e.g., optimization strategy E), a light increase in critical path delay is observed (e.g., 7.9 ns→8.2 ns), even though the rest of the datapath has not changed. It may be attributed to the placement and routing stages of the synthesis flow in the design in the FPGA which are not deterministic. After applying optimization strategy F (e.g., pipelining the address generation unit), however, the increase in the critical path delay is resolved, resulting in a critical path delay of 7.07 ns. Further, due to additional registers used for pipelining, it can be observed that a slight increase in flip flops. In another aspect of the present disclosure, since the critical path delay was reduced (e.g., 7.07 ns), the bitwidth of the design may be increased from 16-bits to 18-bits to improve the accuracy of the design. This may result in a slight increase in the BRAM usage (e.g., from 6.53% to 6.8%) and an overall speedup factor of 33.4× compared to the baseline architecture design.

TABLE 8

Performance Analysis of Optimizations Applied over Baseline Architecture with 1 to 8 Butterfly Units

| Version | # of bflys | Total cycles | Critical path delay (nsec) | Total time (sec) | FFTs/ second | Gigasamples/ second | Speedup |
|---|---|---|---|---|---|---|---|
| Baseline Architecture | 1 | 524290 | 29.5 | 0.015467 | 64.65564 | 0.00423727 | 1 |
| Optimizations A, B, C | 1 | 524293 | 6.879 | 0.003607 | 277.2686 | 0.01817107 | 4.3 |
| Optimizations A, B, C, D | 8 | 65542 | 7.9 | 0.000518 | 1931.315 | 0.12657069 | 29.9 |
| Optimizations A, B, C, D, E | 8 | 65543 | 8.2 | 0.000538 | 1857.458 | 0.122 | 28.7 |
| Optimizations A, B, C, D, E, F | 8 | 65544 | 7.07 | 0.00046 | 2158.0 | 0.141 | 33.4 |

In another aspect of the present disclosure, the impact of increasing the number of butterfly units from 8 to 16 may be evaluated in the design. For example, with 8 butterfly units, the design may require 16:1 MUXes for selecting data from and to the BRAMs. With a 16 butterfly design, however, it may require 32:1 MUXes. As discussed above, it is expected to see an increase in the critical path delay due to routing overhead because 32:1 MUX cannot be implemented using a single slice on the FPGA and it requires two slices to be connected through programmable routing structure. As shown in Table 9, the design with 16 butterfly units may result in a critical path delay increase by 49.5% (e.g., 10.572 ns) compared to the design with 8 butterfly units with the same optimization strategies of A, B, C, D, E, and F (e.g., 7.07 ns). However, it is also noted that when the butterfly unit count is increased from 8 to 16, the total number of iterations is reduced by half. Thus, in overall, 16 butterfly design may deliver at least a speedup factor of 44.6, compared to the baseline architecture, with a throughput of 0.189 Gsamples/second. Further, since the butterfly unit count increases from 8 to 16, the BRAM usage increases (e.g., 6.80→12.93) as shown in Table 10. However, the stress on LUT usage for implementing the 16:1 MUXes may result in a dramatic increase in LUT usage ratio from 4.86% to 21.14% as shown in Table 10.

TABLE 9

Performance Analysis of Optimizations Applied over Baseline with 1 to 16 Butterfly units

| Version | # of bflys | Total cycles | Critical path delay (nsec) | Total time (sec) | FFTs/ second | Gigasamples/ second | Speedup |
|---|---|---|---|---|---|---|---|
| Baseline | 1 | 524290 | 29.5 | 0.015467 | 64.65564 | 0.00423727 | 1 |
| Optimizations A, B, C | 1 | 524293 | 6.879 | 0.003607 | 277.2686 | 0.01817107 | 4.3 |
| Optimizations A, B, C, D, E, F | 8 | 65544 | 7.07 | 0.00046 | 2158.0 | 0.141 | 33.4 |
| Optimizations A, B, C, D, E, F | 16 | 32774 | 10.572 | 0.00035 | 2886.1 | 0.189 | 44.6 |

TABLE 10

Resource Utilization of 1 Butterfly (BFLY) and 8 and 16 Butterfly based Designs After Optimizations A, B, C, D and E Resource Usage (%)

| BFLY | BRAM | LUT | LUT RAM | FlipFlop | DSP |
|---|---|---|---|---|---|
| 1 | 7.76 | 0.1 | 0.02 | 0.07 | 0.11 |
| 8 | 11 | 4.8 | 0.8 | 0.9 | 0.89 |
| 8 with optimization | 6.80 | 4.86 | 0.11 | 0.58 | 0.89 |
| 16 with optimization E, F | 12.93 | 21.14 | 0.2 | 1.3 | 1.78 |

Further, in addition to these optimization strategies, multiple lanes for parallel FFT may be employed to improve and increase the efficiency of the FFT design. That is, in an aspect of the present disclosure, an optimization relating to lane-based parallelization approach may be combined with other optimization strategies.

By way of example, as shown in Table 10 above, based on the resource usage of the 16 butterfly units-based design, it may be limited to implementation of a 4-lane based architecture since the LUT usage ratio is 21.14% and the objective may be to remain below 80%, 6 usage ratio. For the 16 butterfly units design, the BRAM module is no longer the limiting factor for multiple lane-based parallelization. With 4-lanes, it is only possible to achieve 0.75 Giga samples per second assuming ideal behavior. Thus, it may be concluded that increasing the number of butterfly units beyond 8 may not be a desirable choice for the design.

On the other hand, the butterfly units-based design after optimization strategies (twiddle factor reduction via BRAM reduction) and F (pipelining address generation unit) has BRAM usage ratio of 6.8%. This may allow implementing 11 lane-based architecture with BRAM usage of 74.8%, which is below the target of 80% usage ratio. The scalability of the design may be demonstrated by implementing 10 lane and 11 lane-based architecture. Table 11 illustrates comparison of multi-lane design.

TABLE 11

Performance Analysis of Optimizations Applied over Baseline with 1 Butterfly Unit

| Version | # of bflys | Total cycles | Critical path delay (nsec) | Total time (sec) | FFTs/ second | Gigasamples/ second | Speedup |
|---|---|---|---|---|---|---|---|
| Baseline Architecture | 1 | 524290 | 29.5 | 0.015467 | 64.65564 | 0.00423727 | 1 |
| Optimizations A, B, C | 1 | 524293 | 6.879 | 0.003607 | 277.2686 | 0.01817107 | 4.3 |
| Optimizations A, B, C, D, E, F | 8 | 65544 | 7.07 | 0.00046 | 2158.0 | 0.141 | 33.4 |
| Optimizations A, B, C, D, E, F | 16 | 32774 | 10.572 | 0.00035 | 2886.1 | 0.189 | 44.6 |
| Optimizations A, B, C, D, E, F, G with 10 lanes | 8 | 65544 | 7.934 | 0.00052 | 1923.0 | 1.26 | 297.4 |
| Optimizations A, B, C, D, E, F, G with 11 lanes | 8 | 65544 | 8.589 | 0.00056 | 1776.4 | 1.28 | 302.2 |

TABLE 12

Resource Utilization of 1 Butterfly (BFLY), 8 and 16 Butterfly-based Designs After Optimizations A, B, C, D, E, F, G Resource Usage (%)

| BFLY | BRAM | LUT | LUT RAM | FlipFlop | DSP |
|---|---|---|---|---|---|
| 1 | 7.76 | 0.1 | 0.02 | 0.07 | 0.11 |
| 8 | 6.80 | 4.86 | 0.11 | 0.58 | 0.89 |
| 8 with 10 lanes | 68.03 | 49.02 | 1.11 | 5.78 | 8.89 |
| 8 with 11 lanes | 71.84 | 63.86 | 20.62 | 6.41 | 9.78 |

In the example, compared to a single lane architecture for the 8-butterfly units-based design, the critical path delay slightly increases for the 11-lane based architecture. This is due to the additional routing overhead introduced by the size of the design. With 10 lanes, it is at a throughput of 1.26 G samples/second with a speed up factor of 8.9× compared to the single lane design. The 11-lane based design results in a throughput reaching 1.28 G samples/second with 71.84% BRAM usage ratio. It is noted that there is a diminishing return with the 11-lane based design, because there is a significant increase in LUT RAM usage compared to the 10-lane based design (e.g., 1.11→20.62). Thus, it may be noted that the resource usage linearly may increase with the number of lanes and with the 11-lane based design, the resource utilization is still below 80%. Thus, in an aspect of the present disclosure, an optimization strategy of multi-lane design approach may be applied, alone or in combination with other optimization strategies, to further improve and increase the performance of the FFT design.

Further, in an aspect of the present disclosure, the lane controller may be implemented in various ways. For example, hardware implementation of a lane controller may allow streaming samples into N FFT lanes running in parallel and ensure scalability of the implementation for the target FPGA device. In one implementation, assuming that the FFT engine is receiving batches of 65K samples, the lane controller may stream each batch in a cyclic manner to each FFT lane. By doing so, based on implementation of optimization strategies A-F, the throughput may be 0.189 G samples/second, and the lane controller may ensure that each lane is occupied.

Figure 6:
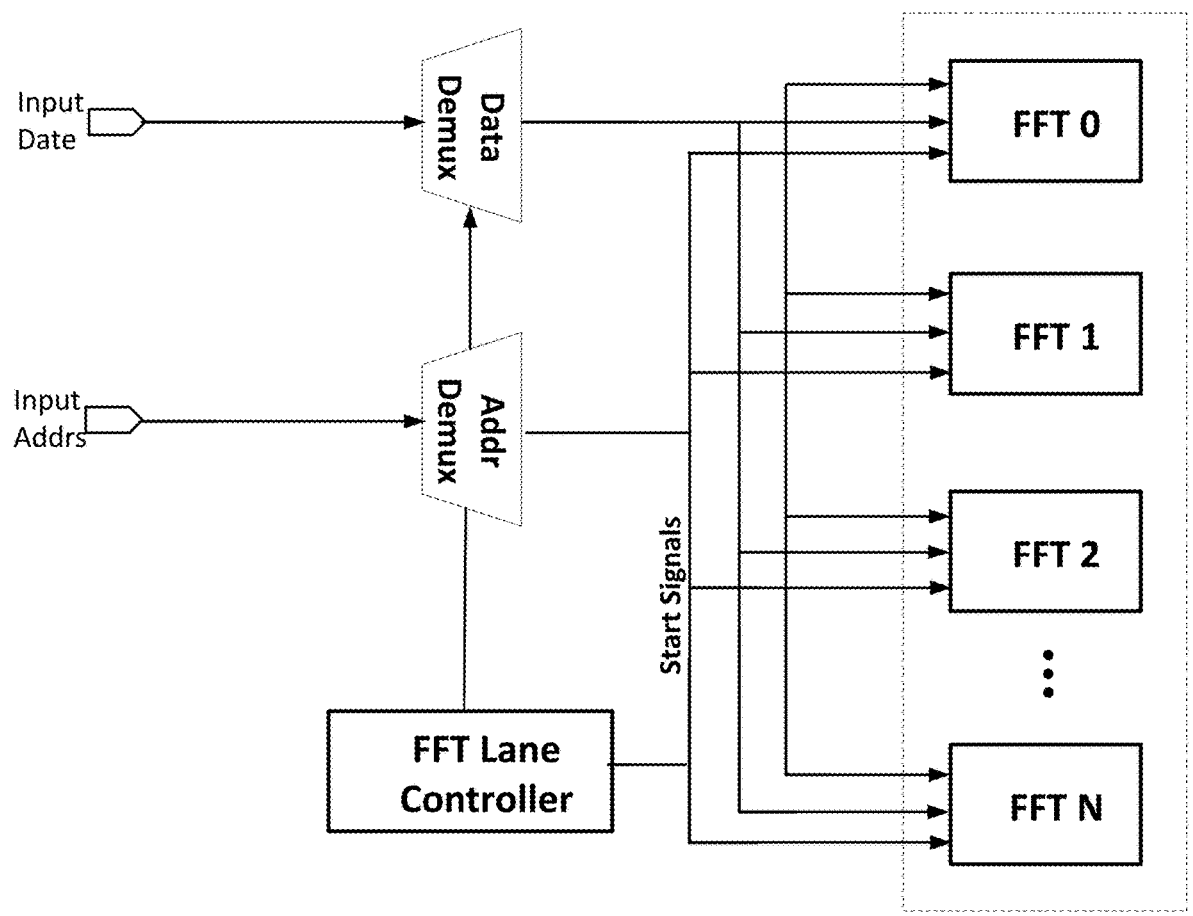
FIG. 6 illustrates an example embodiment of the present technology in accordance with an aspect of the present disclosure.

FIG. 6 illustrates an example diagram conceptually illustrating implementation of N FFT lanes running in parallel. By way of example, the unit allows streaming samples into "N" FFT lanes running in parallel and ensures scalability of implementation for a target FPGA device. Assuming the FFT engine is receiving batches of 65K samples, the lane controller unit streams each batch in a cycle manner to each FFT lane. Given that based on optimizations A-F, the throughput is 0.189 Gsamples/second and the lane controller ensures that each lane is occupied. In the example, 8 samples/cycle may be written assuming that we are utilizing the 8-butterfly based design.

The actual measurements show that it may take 4096 cycles to populate the 65K samples to generate a single batch job on an FFT lane. The FPGA operates at 126 MHz for the 10-lane based design. Thus, it may take around 64 microseconds (us) to prepare the data in the BRAM for each FFT lane. Each FFT batch takes 520 microseconds. In an aspect of the present disclosure, a double buffering scheme may be used to process one batch while streaming the second batch. But this may require additional BRAM resources and limit the scalability of the implementation. Thus, rather than using the double buffering, in another aspect of the present disclosure, lane duplication may be employed as a means to improve computation capability along with a similar increase in memory footprint. Further, the lane duplication may ensure the availability of at least one lane for a new coming batch.

In another aspect of the present disclosure, performance analysis of combination of optimization strategies A, B, C, D, E, F, G, and/or lanes may be presented below. By way of example, if a resource limited FPGA is targeted, such as Artix-7A 100T with 13140 Kb total BRAM capacity (130 BRAM blocks in total) as opposed to the BRAM capacity of 1470 in the Virtex-7, it may be possible to realize a single lane implementation without sacrificing the critical path delay noted herein for the single lane implementation. As such, the present technology may be targeted for resource rich FPGAs. By way of example, on the Virtex7 UltraScale VCU110 with 3870 BRAM blocks, the number of lanes may increase linearly, reaching 34 lanes for the FFT engine.

Figure 7B:
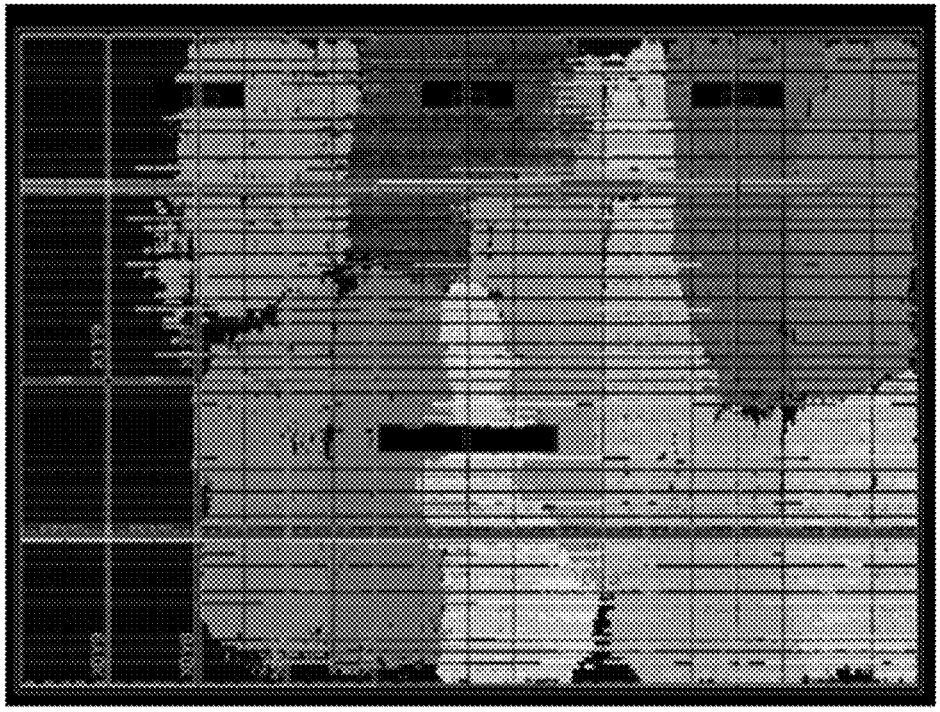
FIGS. 7A and 7B illustrate an example embodiment of the present technology in accordance with an aspect of the present disclosure.
Figure 7A:
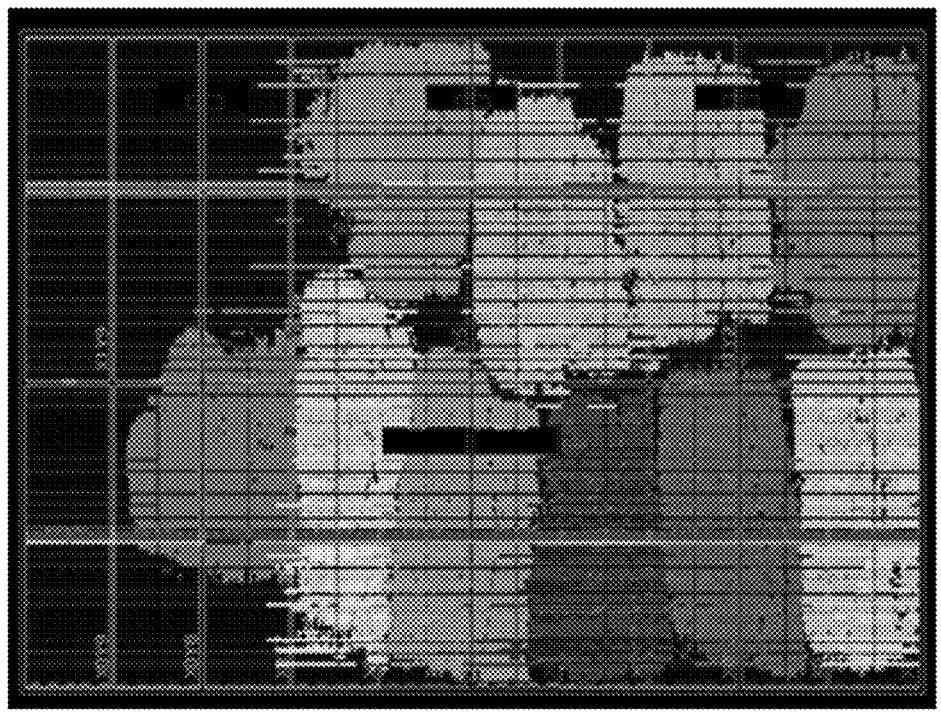

FIGS. 7A and 7B illustrate post-routing layout for the 10-lane and 11-lane based design, respectively. In the examples, each lane shows up as clearly isolated designs indicated in different color code. Further, for the 10-lane layout (FIG. 7A), distinct and homogenous lanes populated on the FPGA may be observed. However, for the 11-lane design (FIG. 7B), the lanes that are placed at the center of the FPGA are squeezed between other lanes with longer paths. This may increase the critical path delay of the overall circuit.

For comparison purposes, in an aspect of the present disclosure, a similar design utilizing Xilinx LogicCore FFT IP v9.1 may be synthesized and compared with the present technology in terms of resource utilization and throughout. In the present disclosure, the 10-lane design may be identified as the best resource/performance tradeoff and comparison results are presented in Table 13 below.

TABLE 13

Resource and Performance Comparison of 10-lane Architecture with 10 Xilinx FFT 1Ps

| | BRAM | LUT | LUT RAM | Flip Flop | DSP |
|---|---|---|---|---|---|
| 10-Lanes 8 BFLY FFT | 68.03% | 49.02% | 1.11% | 5.78% | 8.89% |
| | Cycles per FFT | | Critical Path (ns) | | Throughput (Gigasample/sec) |
| | 65544 | | 7.934 | | 1.26 |
| 10 Lanes of Xilinx FFT | 82.% | 150% | 8% | 11% | 20% |
| | Cycles per FFT | | Critical Path (ns) | | Throughput (Gigasample/sec) |
| | 131228 | | 5.8 | | 0.859 |

In the example, it is noted that a simple design was synthesized targeting the Virtex-7 VC707 development board to obtain timing and resource results while the testbench included with the IP was utilized to obtain count and latency characteristics. As can be shown in Table 13, while the Xilinx IP core supports fully streaming operation, it may be ultimately bottlenecked compared to the design example in accordance with an aspect of the present disclosure, due to its ability to only accept a single sample per clock cycle. Along those lines, to support fully streaming FFT operation on each individual FFT, the Xilinx design may require a higher amount of BRAM to perform the buffering necessary to ensure that old data is not overwritten before computations are complete. In comparison, due to the way that each of the FFT lanes is multiplexed to enable streaming support without any individual lane supporting streaming, a reduction in BRAM requirements per lane and overall better scalability is noted in the present technology disclosed herein compared to the Xilinx FFT design. In overall, although the Xilinx FFT design fairly performs for comparatively low throughput applications, the Xilinx FFT design achieves only 68% of the throughout achieved by the design of the present disclosure on the same platform. As such, the present technology provides much enhanced or increased performance results compared to any conventional design or methodologies that may be employed to date for FFT design.

Figure 8:
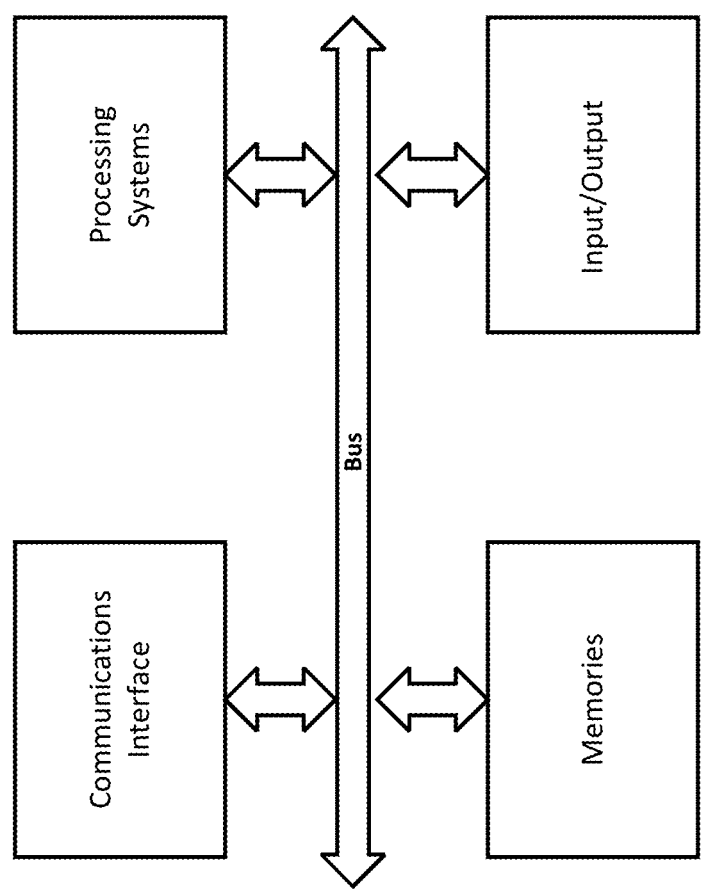
FIG. 8 is a diagram conceptually illustrating an example embodiment of the present technology in accordance with an aspect of the present disclosure.

FIG. 8 shows a diagram illustrating an example of a processing system, which may be implemented in a processor or hardware programmable device (e.g., the FPGA) for the present technology. The baseline architecture as well as further optimization strategies may be implemented in part or as a whole, using one or more processing systems of FIG. 8. As shown in FIG. 8, the bus may link together various circuits, including one or more processing systems (or processors), one or more memories, one or more communication interfaces, and/or one or more input/output devices. The one or more processing systems may be responsible for managing the bus and general processing, including the execution of software stored on a non-transitory computer-readable medium. Further, the one or more processing systems may include one or more processors, such as microprocessors that interpret and execute instructions. In other implementations, the one or more processing systems may be implemented as or include one or more application specific integrated circuits, field programmable logic arrays, or the like. The software, when executed by the one or more processing systems, may cause the one or more processing systems to perform the various functions described herein for any particular apparatus. The non-transitory computer-readable medium may also be used for storing data that is manipulated by the one or more processing systems when executing software. The one or more memories may include various types of memories, including random access memory and/or a read only memory, and/or other types of magnetic or optical recording medium and its corresponding device for storing information and/or instructions and/or retrieval thereof. The one or more communication interfaces may also include any transceiver-like mechanism that enables communication with other devices and/or systems. The one or more input/output devices may include devices that permit inputting information and/or outputting information to an operator.

As used in the present disclosure, except explicitly noted otherwise, the term "comprise" and variations of the term, such as "comprising," "comprises," and "comprised" are not intended to exclude other additives, components, integers or steps.

The terms "first," "second," and so forth used herein may be used to describe various components, but the components are not limited by the above terms. The above terms are used only to discriminate one component from other components, without departing from the scope of the present disclosure. Also, the term "and/or" used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. A singular form may include a plural form if there is no clearly opposite meaning in the context. In the present disclosure, the term "include" or "have" used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations. Furthermore, the article "a" used herein is intended to include one or more items. Moreover, no element, act, step, or instructions used in the present disclosure should be construed as critical or essential to the present disclosure unless explicitly described as such in the present disclosure.

Even though particular combinations of features are disclosed in the specification and/or recited in the claims, these combinations are not intended to limit the disclosure of the present technology. Further, the methods or methodologies for the present technology disclosed herein may be implemented in software, hardware, any combinations of software and hardware, a computer program or firmware incorporated in a computer readable medium for execution by a controller, a processor, a computer, or a processing system that includes one or more processors. Examples of a processing system may include microcontroller(s), microprocessor(s), digital signal processors (DSPs), discrete hardware circuit (s), gated logic, state machine(s), programmable logic devices (PLDs), FPGAs, and other suitable hardware configured to perform various functions described herein. The term "software" used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

The following references are also incorporated by reference in their entirety in the present disclosure, wherever mentioned in the present disclosure.

[1] Richardson, Markovic, et al., Building Conflict-Free FFT Schedules, IEEE TRANSACTIONS ON CIRCUITS AND SYSTEMS-I: REGULAR PAPERS, 62(4). April, 2015, 1146-1155.

[2] J. Wu, K. Liu, B. Shen, and H. Min, "A hardware efficient VLSI architecture for FFT processor in OFDM systems," in Proc. 6th Int. Conf. ASIC (ASICON 2005), October 2005, vol. 1, pp. 232-235.

[3] Z. Qian and M. Margala, "A novel low-power and in-place split-radix FFT processor," in Proc. 24th Ed. Great Lakes Symp. VLSI, 2014, ser. GLSVLSI '14, pp. 81-82 [Online]. Available: http://doi.acm.org/10. 1145/2591513.2591563

[4] H.-F. Luo, Y.-J. Liu, and M.-D. Shieh, "Efficient memory-addressing algorithms for FFT processor design," IEEE Trans. Very Large Scale Integr. (VLSI) Syst., 2014 [Online]. Available: http://ieeexplore.ieee.org

[5] M. C. Pease, "Organization of large scale Fourier processors," J. ACM (JACM), vol. 16, no. 3, pp. 474-482, 1969.

[6] L. Johnson, "Conflict free memory addressing for dedicated FFT hardware," IEEE Trans. Circuits Syst. II, Analog Digit. Signal Process., vol. 39, no. 5, pp. 312-316, 1992.

[7] J. H. Takala, T. Jarvinen, and H. Sorokin, "Conflict-free parallel memory access scheme for FFT processors," in Proc. Int. Symp. Circuits Syst. (ISCAS '03), Bangkok, Thailand, vol. 4, pp. IV. 524-IV. 527.

[8] Y. Ma, "An effective memory addressing scheme for FFT processors," IEEE Trans. Signal Process., vol. 47, no. 3, pp. 907-911, 1999.

[9] C.-H. Chang, C.-L. Wang, and Y.-T. Chang, "A novel memory-based FFT processor for DMT/OFDM applications," in Proc. IEEE Int. Conf. Acoust., Speech, Signal Process., Phoenix, Ariz., USA, 1999, vol. 4, pp. 1921-1924.

[10] J. A. Hidalgo, J. Lopez, F. Arguello, and E. L. Zapata, "Area-efficient architecture for fast Fourier transform," IEEE Trans. Circuits Syst. II, Analog Digit. Signal Process., vol. 46, no. 2, pp. 187-193, 1999.

[11] S. Richardson, O. Shacham, D. Markovié, and M. Horowitz, "An area-efficient minimum-time FFT schedule using single-ported memory," in Proc. IFIP/IEEE 21st Int. Conf. Very Large Scale Integr. (VLSI-SoC), Istanbul, Turkey, 2013, pp. 39-44.

[12] J. Baek and K. Choi, "New address generation scheme for memory-based FFT processor using multiple radix-2 butterflies," in Proc. SoC Int. Design Conf. (ISOCC '08), November 2008, vol. 01, pp. I-273-I-276.

[13] M. C. Pease, "Organization of large scale Fourier processors," J. Assoc. Comput. Mach., vol. 16, no. 3, pp. 474-482, July 1969.

[14] L. G. Johnson, "Conflict free memory addressing for dedicated FFT hardware," IEEE Trans. Circuits Syst. II, vol. 39, pp. 312-316. May 1992.

[15] J. Baek and K. Choi, "New address generation scheme for memory-based FFT processor using multiple radix-2 butterflies," in Proc. SoC Int. Design Conf. (ISOCC '08), November 2008, vol. 01, pp. I-273-I-276.

[16] S. Johnson and M. Frigo, "A modified split-radix FFT with fewer arithmetic operations," IEEE Trans. Signal Process., vol. 55, no. 1, pp. 111-119, January 2007.

[17] Ping-Chang Jui, Chin-Long Wey, and Muh-Tian Shiue, "Low-cost parallel FFT processors with conflict-free ROM-based twiddle factor generator for DVB-T2 applications," 2013 IEEE 56th International Midwest Symposium on Circuits and Systems (MWSCAS), Columbus, Ohio, 4-7 Aug. 2013, Page(s): 1003-1006

[18] J.-C. Chi and S.-G. Chen, "An efficient FFT Twiddle Factor Generator," Proceedings of European Signal Processing Conference (EUSIPCO), Vienna, Austria, September 2004.

[19] J.-H. Kim and I.-C. Park, "A 2048-Point FFT Processor Based on Twiddle Factor Table Reduction," IEEE Symp. on Low-Power and High-Speed Chips (COOL Chips 2007), 2007, pp. 351-364.

[20] J.-H. Kim and I.-C. Park, "Long-point FFT Processing Based on Twiddle Factor Table Reduction," IEICE Trans. on Fundamentals of Electronics, Communications and Computer Sciences, 2007, pp. 2526-2532.

[21] Y. Jiang, T. Zhou, Y. Tang, and Y. Wang, "Twiddle-Factor-Based FFT Algorithm with Reduced Memory Access," Proceedings of International Parallel and Distributed Processing Symp., 2002.

What is claimed is:

1. An apparatus for Fast Fourier Transform (FFT) to be implemented in hardware, comprising:
    a radix-2 butterfly unit configured to read data inputs from a memory bank and write data outputs to the memory bank;
    a twiddle factor table coupled to the radix-2 butterfly unit; and
    an address generation unit (AGU) coupled to the memory bank and to the twiddle factor table,
    wherein the address generation unit is configured to generate conflict free addresses of the memory bank during operation of the radix-2 butterfly unit, and
    wherein the conflict free addresses are generated by the AGU based on incremental rotation of toggle bits over multiple stages of a state machine for a given FFT design.

2. The apparatus of claim 1, wherein the memory bank comprises at least two separate block random access memory (BRAM).

3. The apparatus of claim 1, further comprising a plurality of multiplexer units disposed between the radix-2 butterfly unit and the memory bank.

4. The apparatus of claim 1, wherein the twiddle factor table is configured to store twiddle factors with a stride amount of an offset.

5. The apparatus of claim 1, wherein the hardware comprises a field programmable gate array (FPGA).

6. The apparatus of claim 1, wherein the radix-2 butterfly unit is configured to include a three-stage pipelined operation such that multiple samples are processed concurrently.

7. The apparatus of claim 1, wherein the memory bank is configured to include a pipelined read enabled memory block.

8. The apparatus of claim 1, wherein a bitwidth of data is reduced based on a size for each sample received from an analog-to-digital converter (ADC).

9. The apparatus of claim 1, wherein the radix-2 butterfly unit comprises a plurality of radix-2 butterfly units disposed in parallel.

10. The apparatus of claim 1, further comprising a lane controller configured to output data samples into a plurality of FFT lanes running in parallel.

11. The apparatus of claim 10, wherein a number of the FFT lanes is determined based on at least one of: a memory bank utilization, a critical path delay, or a throughput.

12. A Fast Fourier Transform (FFT) circuit comprising:
   a plurality of block memory banks;
   a plurality of radix-2 butterfly units coupled to the plurality of block memory banks;
   a twiddle factor table coupled to the plurality of radix-2 butterfly units; and
   an address generation unit (AGU) coupled to the plurality of block memory banks and the twiddle factor table,
   wherein the address generation unit is configured to generate conflict free addresses in the plurality of block memory banks for operation of the plurality of radix-2 butterfly units,
   wherein each of the plurality of bock memory banks is pipelined,
   wherein each of the plurality of radix-2 butterfly units includes a multi-stage pipelined structure, and
   wherein the conflict free addresses are generated by the AGU based on incremental rotation of toggle bits over multiple stages of a state machine for a given FFT design.

13. The FFT circuit of claim 12, further comprises a lane controller configured to output data samples into a plurality of FFT lanes running in parallel.

14. The FFT circuit of claim 13, wherein a number of FFT lanes is determined based on at least one of: a memory bank utilization, a critical path delay, or a throughput.

15. The FFT circuit of claim 12, wherein the twiddle factor table is configured to store twiddle factors with a stride amount of an offset.

16. The FFT circuit of claim 12, wherein a bitwidth of data is reduced based on a size for each sample received from an analog-to-digital converter (ADC).

17. An apparatus for Fast Fourier Transform (FFT) comprising:
   a first unit comprising:
      a first memory bank;
      a first butterfly unit configured to read data inputs from the first memory bank and write data outputs to the first memory bank;
      a first twiddle factor table coupled to the first butterfly unit; and
      a first plurality of multiplexers disposed between the first memory bank and the first butterfly unit;
   a second unit comprising:
      a second memory bank;
      a second butterfly unit configured to receive data inputs from the second memory bank and write data outputs to the second memory bank;
      a second twiddle factor table coupled to the second butterfly unit;
      a second plurality of multiplexers disposed between the second memory and the second butterfly unit; and
   an address generation unit (AGU) coupled to the first unit and the second unit,
   wherein the address generation unit is configured to generate conflict free addresses of the first memory bank and the second memory bank during FFT computation, and
   wherein the conflict free addresses are generated by the AGU based on incremental rotation of toggle bits over multiple stages of a state machine for a given FFT design.

* * * * *